Figure 1:
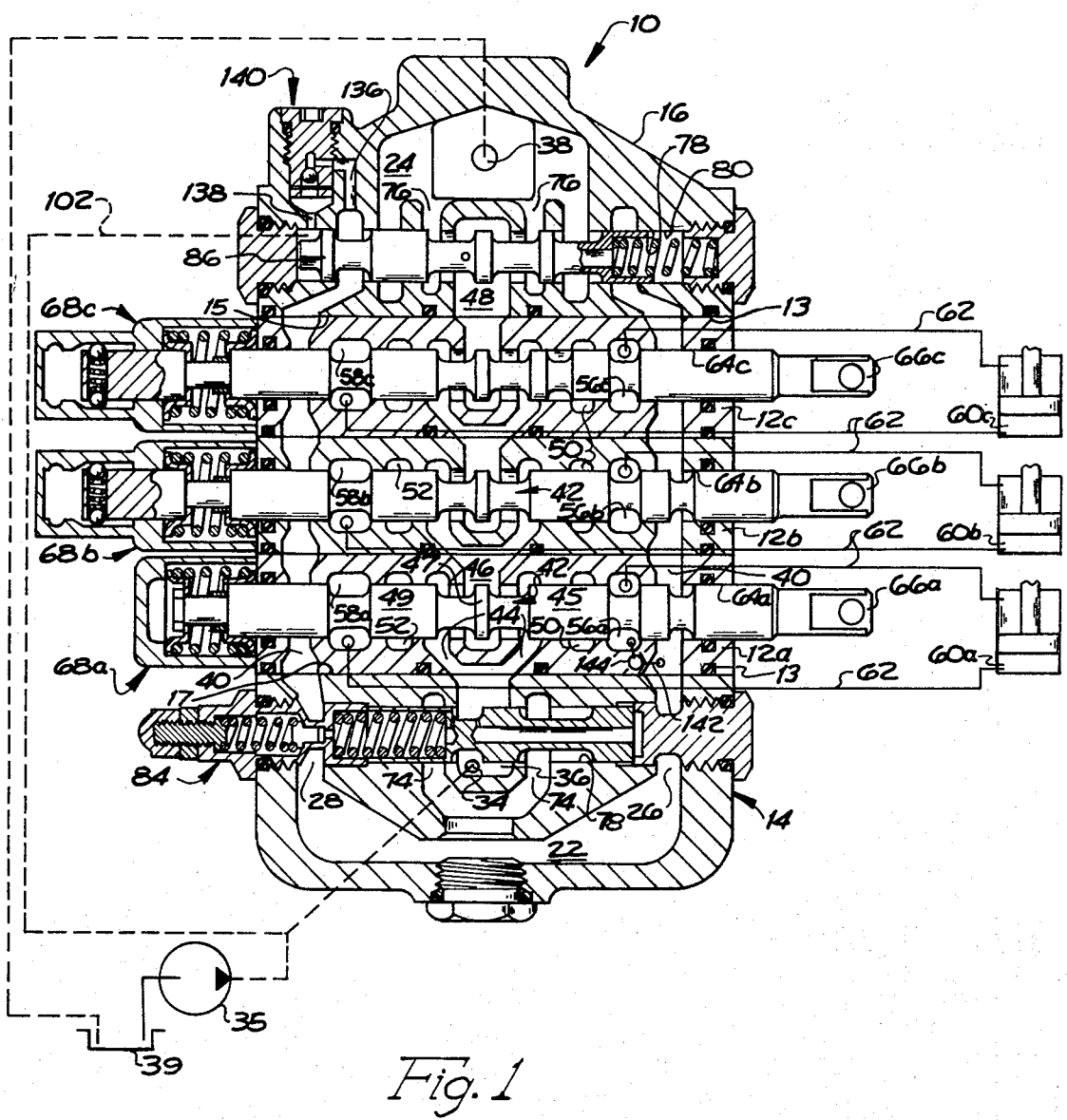

United States Patent
Ailshie

[11] 3,771,558
[45] Nov. 13, 1973

[54] COMBINED OPEN-CENTER PRESSURE CONTROL AND REGENERATION VALVE
[75] Inventor: Roger H. Ailshie, Lewis, Kans.
[73] Assignee: Cross Manufacturing, Inc., Lewis, Kans.
[22] Filed: July 20, 1972
[21] Appl. No.: 273,362

[52] U.S. Cl.......... 137/596.13, 137/625.69, 91/420, 91/436
[51] Int. Cl............................................ F15b 11/16
[58] Field of Search...................... 91/420, 436, 452; 137/596.12, 596.13, 625.69

[56] References Cited
UNITED STATES PATENTS
3,613,711  10/1971  Wilke............................ 91/420 X
2,651,324  9/1953   Hodgson et al................ 137/596.12
3,527,328  9/1970   Maurice....................... 137/625.69 X Primary Examiner—Alan Cohan
Assistant Examiner—Gerald A. Michalsky
Attorney—Miller & Brown

[57] ABSTRACT

A pressure responsive flow restricting valve in an end section of an open-center sectional control valve assembly maintains a constant pressure differential on the control spools across the open-center flow passages in the assembly. The flow restricting valve is shiftable to a regenerative position blocking exhaust flow from the assembly whenever inlet pressure drops below a predetermined level to permit regeneration of the exhaust flow to supplement inlet flow to the assembly.

10 Claims, 2 Drawing Figures

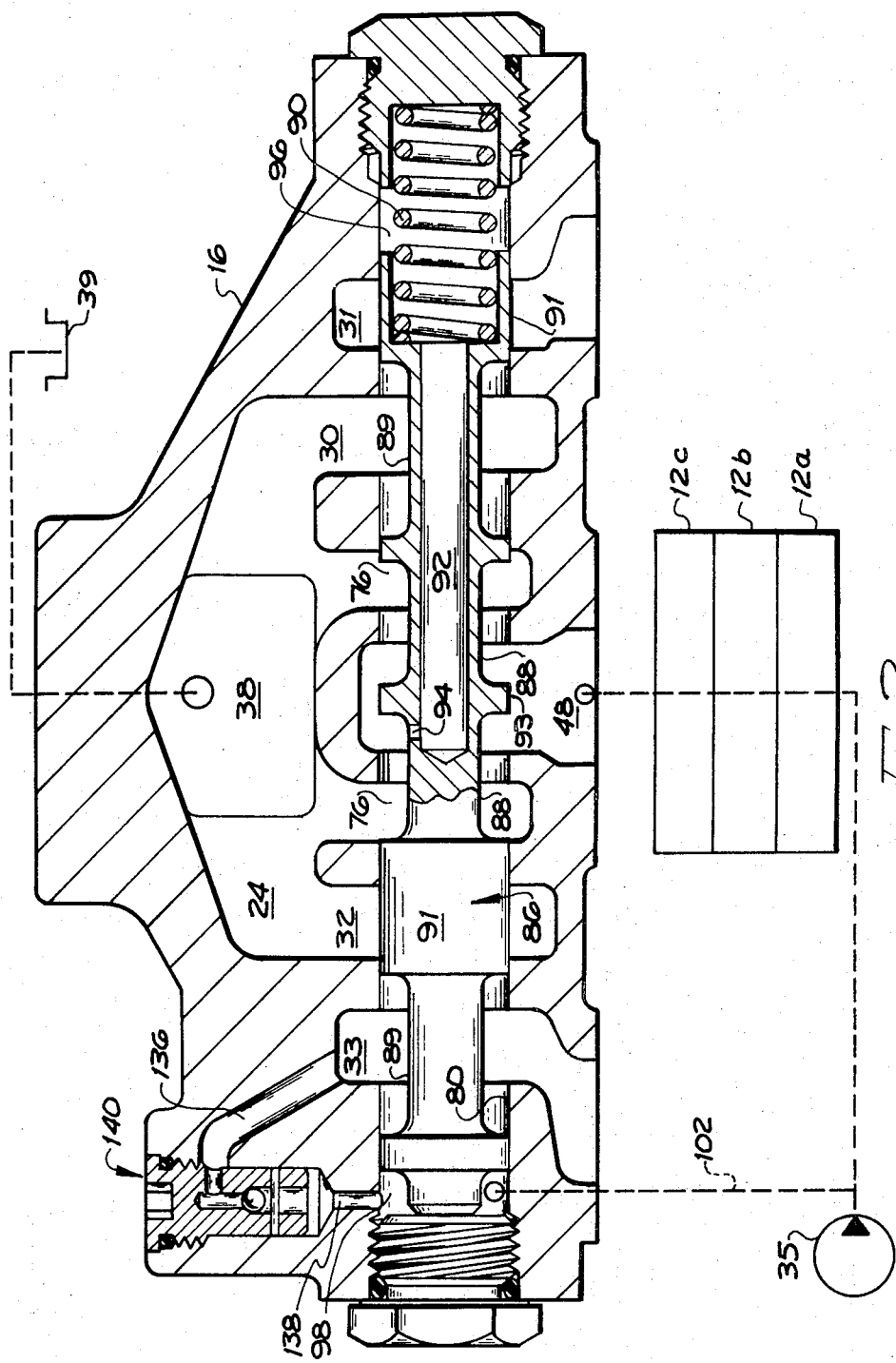

COMBINED OPEN-CENTER PRESSURE CONTROL AND REGENERATION VALVE

BACKGROUND OF THE INVENTION

This invention relates to pressure and flow control means for hydraulic control valves, and relates to such instrumentality for multiple directional control valve assemblies.

Multiple spool control valves generally comprise a plurality of directional control valve sections, each provided with a shiftable, cannelured control spool controlling fluid flow to one or more specific hydraulic motors, sandwiched between inlet and outlet end plate sections having ports connectable with a source of motive fluid and a low pressure reservoir. Open-center type assemblies permit continuous flow transversely through the assembly from inlet to outlet when all the spools are in neutral non-operative positions. Upon shifting a control spool to divert the motive fluid to actuate the associate motor, the spool variably shuts off the open-center flow.

A serious drawback to such open-center assemblies is the variable pressure differential exerted across the shifting spool. As well known in the art, the resulting abrupt change in direction of the flow at this juncture, Bernoulli forces and other factors combine to exert a substantial force tending to shift the spool. With larger gallonage valves operating at sometimes quite high pressure, the forces exerted on the spool make it extremely difficult to control spool movement manually. While this problem is somewhat reduced by utilizing power means other than manual force to move the spool, the same forces caused by these pressure differentials are still present, and control of spool movement remains too unpredictable and non-repeatable to provide precise and effective flow control. Furthermore, the use of power means to shift the spool drastically compounds the complexity, expense, and other undesirable features of flow control valves.

A particular type of control valve circuitry that has found wide acceptance in valve assemblies is regenerative circuitry. This is especially necessary in operating a heavily loaded hydraulic motor whose external load is capable of outrunning the fluid flow delivered thereto, resulting in a cavitation condition. Regenerative circuitry alleviates this problem by blocking the exhaust fluid flow in the assembly from the outlet port and diverting same back to the inlet side of the motor to supplement inlet flow. Instrumentality utilized to selectively block the exhaust flow is most conveniently located in the outlet section, thereby limiting the space available for other control instrumentality therein. Furthermore, while such regenerative circuitry is adequate in many applications, in certain situations pressure surges develop in the regenerating exhaust flow that is being carried through the low pressure passages in the control valve assembly. In such instances the sealing members surrounding these low pressure passages are easily destroyed by the pressure surges. The expense involved in attempting to utilize high pressure sealing members for the low pressure return passages has heretofore been found unacceptable, rendering the valve assemblies non-competitive.

Accordingly, it is the primary object of the present invention to provide an open-center type control valve having a pressure responsive member that automatically maintains a substantially constant pressure differential across the control valve spool at the open-center passages to provide constant handle forces and accurate metering of the control spool, and wherein this same member is capable of blocking exhaust flow in return passages from the outlet port to allow regeneration of the exhaust flow to supplement inlet fluid flow to the valve.

A corollary to the above object is to locate the pressure responsive member in an assembly of stack valves so that it is operable to maintain a constant pressure differential across any one of the spools that is shifted.

Another important object of the present invention is to provide an assembly as described which is operable to control a hydraulic motor subject to large inertial loads, wherein there is provided low pressure regenerating means for diverting fluid displaced from one side of the motor back to the other side to preclude formation of cavitation conditions, and wherein is provided means for relieving instantaneous surge pressures in the low pressure return circuitry to prevent seal destruction.

These and other more particular objects and advantages of the present invention are specifically set forth in, or will become apparent from the following detailed description of a preferred form of the invention when read in conjunction with the accompanying drawings, wherein:

FIG. 1 is a central cross-sectional plan view, with certain elements shown schematically, of a multiple spool stack valve and hydraulic system constructed in accordance with the principles of the present invention; and FIG. 2 is a central cross-sectional plan view of the outlet end plate and the pressure control member with other elements of the assembly shown schematically.

Referring now to the drawings for a more detailed description of the drawings, there is illustrated in FIG. 1 a multiple spool sectional control valve assembly 10, including a trio of directional control valve sections 12a, 12b, 12c sandwiched between an inlet port plate section 14 and an outlet port plate section 16. Appropriate securing means, not seen in the drawings, bolt the several sections together with faces 15 and 17 of the respective end plate sections abutting the adjacent control valve sections. O-ring seals 13 are utilized between the sections in a conventional manner.

Each of the end plate sections 14 and 16 are of similar construction, having exhaust or fluid return passages including longitudinally extending bight portions 22, 24 respectively connecting with transverse leg portions 26, 28, 30 and 32 located at opposite sides of the sections 14 and 16. Outlet section 16 also has a pair of transversely extending return passage portions 31, 33 respectively located adjacent and outside of leg portions 30, 32. A fluid inlet port 34 adapted to be connected with a source of pressure motive fluid 35, opens into a centrally disposed inlet passage 36 in the inlet port, and an outlet port 38 adapted to be connected to a low pressure fluid reservoir 39 communicates with bight portion 24 in outlet end plate 16.

The valve sections 12a, b, c, have a pair of transversely extending return ducts 40 that respectively connect the leg passages 26 and 28 of the inlet plate with the transversely extending portions 31 and 33 in the outlet plate. Each valve section is provided with conventional open-center passage means 42, comprising a pair of passages 44 straddling a center passage 46 that communicate to normally connect inlet passage 36 with a similar central inlet passage 48 in the outlet section 16. A pair of ducts 74, 76 in each end section are disposed on opposite sides of the respective inlet passages 36, 48 thereof. Each valve section has work port ducts 56 and 58 that respectively connect with the opposite sides of double acting hydraulic cylinder motors 60a, b, c, via conduits 62. Each valve section is also provided with longitudinal bores 64a, b, c, intercepting the open center passage means 42, work port ducts 56, 58 and return ducts 40. In each bore there is provided a cannelured, shiftable control valve spool 66a, b, c, having reduced diameter lands capable of selectively interconnecting the various passages intercepting bores 64 a, b, c, to control to and from the hydraulic motors, Spring centering mechanisms 68 bias each manually operated spool 66a, b, c, to the illustrated neutral position clearing open-center passage means 42. With the exception of the construction of end plates 14 and 16, the above described control valve assembly and hydraulic system is of a conventional nature well known in the trade and its operation and further detailed description thereof will not be set forth herein.

In end plate 14, is a closed longitudinal bore 78 intercepting passages 26, 28, 36 and 74; and end plate 16 has a closed longitudinal bore 80 intercepting passages 30, 31, 32, 33, 48 and 76. Drilled passages 136 and 138 connect respectively with portion 33 and bore 80 to define a duct which is intercepted by a one-way check valve assembly 140 threadably mounted to the outlet section 16 to allow only one-way flow through the duct from transversely extending portion 31.

A master relief valve assembly 84 is interposed in the inlet plate bore 78 to operate in conventional fashion in limiting pressure build-up in inlet passage means 36 by selectively shifting in bore 78 to connect the inlet passage with outlet port 38 through the return passage means including passages 74, 22, 26, 28, 40, 30, 31, 32, 33 and 24.

Shiftably mounted in bore 80 is a pressure responsive member in the form of a cannelured spool 86 having a pair of reduced diameter grooves 88 that normally interconnect inlet passage 48 with leg passages 76 when spool 86 is shifted leftwardly, as shown, under the urgings of a biasing spring 90. Another pair of grooves 89 in the spool are capable of interconnecting the adjoining leg and transverse portions of the return passages means, but in the position of the spool illustrated, the left sides of lands 91 are blocking communication between transverse portions 31, 33 and the adjacent leg portions 30, 32. A blind bore 92 and cross duct 94 in spool 86 communicate pressure from inlet passage means 48 to a closed servo chamber 96 containing spring 90. At the left end of spool 86 there is another closed chamber 98 that effectively connects with inlet fluid port 34 via a passage 102, schematically illustrated, extending transversely through assembly 10 to thereby communicate the pressure in the inlet plate passage means 36 with chamber 98. The pressure differential between inlet passage means 36 and 48, therefore, is exerted upon spool 86 along with the force of spring 90 to position and shift spool 86 within bore 80.

Assembly 10 has regenerative flow means that includes a conduit in the form of a duct 142 in the housing, and a one-way check valve 144 in control valve section 12a, as schematically depicted in FIG. 1. Passage 142 extends between return passage 40 and work passage 56a. Check valve 144 permits free fluid flow through passage 142 from the return passage to this work passage whenever pressure in the former exceeds pressure in the latter.

Upon shifting one of the control valve spools 66a, b, or c, to actuate its associated motor, the shifted spool conventionally begins restricting fluid flow through the open-center passage means 42 by lands 45, 47 and 49 blocking flow of fluid from passages 44 to passage 46. This causes a pressure drop across the shifted control spool which gives rise to various longitudinally acting forces on the shifted spool. Normally, the pressure drop varies markedly in relation to travel of the shifted spool 66, thereby creating varying forces on the spool.

Spool member 86 alleviates these problems by maintaining a constant pressure drop across the open-center passage means 42 at the shifted spool 66a, regardless of the distance of travel of the latter mentioned spool and regardless of the magnitude of pressure developed in actuating the associated motor 12a. Spool 86 operates as a second flow restrictor in the open-center passage means downstream of the shifted spool 66a. Spool 86 has land 93 that, along with the right edge of the left land 91, restrict flow to maintain a constant pressure difference between inlet passage means 36 and 48, the magnitude of such pressure difference being proportional to the force exerted by spring 90 which, for example, could be 200 psi. The location of pressure control spool 86 in the outlet section 16 downstream of all the control valve sections allows spool 86 to operate as described regardless of which spool 66a, b, c, is operated. Control spool 86 remains in its non-flow restricting position, as illustrated, until the pressure drop across the open-center passage 42 of control spool 66a reaches a certain amount. At that point, the pressure sensed in chamber 98 is sufficient to overcome the combined force of spring 90 and pressure force in chamber 96 to cause the pressure control spool 86 to move to the right. Any rightward movement causes a restricting effect of the fluid flow across spool 86 thereby building up back pressure in inlet passage 48, which effectively reduces the pressure drop across the control spool 66a. Spool 86 will further restrict the downstream flow depending upon the load on the motor 60a, to the degree necessary to maintain a constant drop across the open-center of control spool 66a.

In conventional and well known fashion, as shown in U.S. Pat. No. 2,873,762, a transverse duct (not shown) is provided in the assembly extending from inlet passage 36 through the several valve sections 12a, b, c, to communicate across corresponding lift check valves (not shown) to a respective U-shaped supply passage that has portions 50, 52 straddling the open-center passages 44 in each valve section. Operation of such lift check circuitry will be apparent to those skilled in the art without more detailed description herein. Suffice it to say that this circuitry provides parallel flow of inlet fluid to the several spool bores at portions 50, 52 whenever flow through the open-center passages is being restricted.

In normal operation, inlet passage pressure is substantially greater than that in the return ducts 40, and this higher pressure holds spool 86 rightwardly permitting returning flow to be exhausted from portions 31, 33 to leg portions 30, 32 and outlet port 38.

When spool 66a is shifted leftwardly to pressurize work passage 56a from inlet flow in passage portion 50 and cause retraction of the piston of cylinder 60a, fluid displaced from the head end of this cylinder returns through work port duct 58a to the adjacent exhaust passage 40 to be ultimately exhausted through outlet port 38. In many instances the piston of cylinder 60a may be externally loaded so as to be driven downwardly faster than inlet fluid can be supplied through duct 56a to the upper end of the cylinder, creating cavitation therein. In such instance the inlet pressure in the control valve assembly drops to a very low level. The spring 90 is thereupon effective to shift spool 86 leftwardly to its regenerative position illustrated, wherein right and left lands 91 block any exhaust of fluid flow to outlet port 38. Fluid being returned from the lower end of cylinder 60a causes pressure buildup in the now blocked exhaust passage means to a level higher than that in the inlet passages of the assembly. Both check valves 140 and 144 now open to allow the exhausting fluid to be regenerated back to work port duct 56a and supplement the inlet fluid flow to the upper end of cylinder 60a and prevent cavitation therein. Once the inlet pressure again rises to a safe level, spool 86 can shift rightwardly to clear the return flow passages and allow fluid exhaust through outlet port 38, as well as to again begin restricting and metering the flow through the open-center passages.

The incorporation of drilled passages 136, 138 has been found to be highly effective in relieving surge flow in return ducts 40 and the accompanying pressure peaks that otherwise result from the surge flow. Passage 136, 138 direct the surge flow from passage 31 back to inlet passage 36 through chamber 98 and passage 102. Seal blow-out and other deleterious affects in the low pressure return ducts are thus eliminated. As a consequence, low pressure, economical sealing members can be used adjacent the low pressure return ducts without fear. The regenerative circuitry presented by this invention, therefore, provides a low pressure regenerative system which is highly effective in preventing cavitation. While the regenerative circuitry has been described with respect to a single motor 60a and associated check valve 144, it will be apparent that any one or more of the motors may similarly be provided with the regenerative feature simply by including additional check valves 144 where desired.

Having thus described the invention, what is claimed as new, and desired to be secured as Letters Patent, is:

1. In an assembly for controlling operation of a hydraulic motor:
   a housing having a longitudinal bore, inlet and outlet ports adapted to be connected respectively to a source of motive fluid and a reservoir, a pair of work passages intercepting said bore and adapted to be connected to opposite sides of said motor, a return passage intercepting said bore and extending to said outlet port, and open-center passage means intercepting said bore and interconnecting said inlet and outlet ports;
   a flow control spool mounted in said longitudinal bore to shift between a neutral position clearing said open-center passage means permitting continuous fluid flow from the inlet port to the outlet port, and another position variably restricting said open-center passage means and diverting fluid from said inlet port to one of said work passages while interconnecting the other of said work passages with said return passage;
   a pressure responsive member movably disposed in another bore in the housing located intermediate said longitudinal bore and said outlet port and intercepting said open-center passage means and said return passage;
   first pressure conducting means communicating fluid from the inlet port upstream of said spool to one end of said member whereby inlet fluid pressure upstream of said spool urges said member toward positions clearing said return passage to permit exhaust fluid flow from said other work passage to said outlet port while variably restricting flow through said open-center passage means;
   second pressure conducting means communicating fluid from said open-center passage means downstream of said spool to an opposite end of said member, whereby the pressure differential in said open-center passage means across the spool is sensed at opposite ends of said member;
   biasing means engaging said member and exerting a predetermined force therein urging the latter toward a regenerative position clearing said open-center passage means while blocking flow through said return passage, said biasing means opposing the force exerted on said member by said upstream pressure, whereby said member is variably positioned to maintain a substantially constant pressure differential across said spool at said open-center passage means as the spool is shifted; and
   regenerative flow control means for permitting one-way fluid flow from said return passage to said one work passage, whereby to allow regeneration of fluid from said other work passage through said return passage to said one work passage when said pressure responsive means is in said regenerative position thereof blocking flow through said return passage to said outlet port.

2. An assembly as set forth in claim 1, wherein said regenerative flow control means includes a conduit spaced from said bore and operably interconnecting said one work passage and said return passage, and a check valve in said conduit permitting one-way flow therethrough to said work passage when pressure in the latter is less than pressure of fluid in said return passage.

3. An assembly as set forth in claim 2, wherein said conduit comprises a first duct in said housing extending between said one work passage and said return passage.

4. An assembly as set forth in claim 3, wherein said housing includes a second duct extending between said return passage and said first pressure conducting means, and wherein is provided a second check valve in said second bypass duct permitting one-way fluid flow from said return passage through said first pressure conducting means to said inlet port to relieve surge flow in said return passage when said member is in said regenerative position thereof.

5. An assembly as set forth in claim 1, said housing including a plurality of spaced longitudinal bores intercepting said return passage and said open-center passage means, and a separate pair of work passages associated with each of the longitudinal bores, there being a control spool in each of said bores capable of variably restricting flow through said open-center passage means and diverting inlet flow to the respective work passage, said member being disposed downstream of all said longitudinal bores and upstream of said outlet port whereby to maintain a substantially constant pressure differential across said open-center passage means at any one of said spools as the latter is shifted.

6. An assembly as set forth in claim 5, said housing further comprising inlet and outlet sections enclosing said spools, said inlet and outlet ports respectively opening into said inlet and outlet sections, said pressure responsive means being disposed in said outlet section.

7. An assembly as set forth in claim 6, wherein said return passage includes a pair of transversely extending portions intercepting said longitudinal bores and said another bore on opposite sides of said open-center passage means, a pair of leg portions in said outlet section intercepting said another bore intermediate said open-center means and said transversely extending portions whereby said member is shiftable to control interconnection of said leg portions and said transversely extending portions through said another bore, and a bight portion in said outer section interconnecting said leg portions with said outlet port.

8. An assembly as set forth in claim 6, said one end of the member cooperating with said outlet section to define a first closed pressure chamber, said first conducting means communicating with said first chamber.

9. An assembly as set forth in claim 8, said opposite end of the member cooperating with said outlet section to define a second closed pressure chamber, said second conducting means including an internal passage in said member opening into said second chamber and communicating with said open-center passage means through said another bore in all positions of said member.

10. An assembly as set forth in claim 1, said member comprising a cannelured control spool having first land means cooperable with said housing to variably restrict flow through said open-center passage means as said spool moves within said another bore, and second land means cooperable with said housing to block flow through said return passage at said another bore upon shifting said member to said regenerative position.

* * * * *